(12) United States Patent
Horner et al.

(10) Patent No.: US 6,347,826 B1
(45) Date of Patent: *Feb. 19, 2002

(54) COVERING SYSTEM

(75) Inventors: John F. Horner, Jupiter; Robert A. Wood, Jr., Palm City, both of FL (US); Richard J. Coughtry, La Grange, GA (US)

(73) Assignee: John Donovan Enterprises-FL., Inc., Stuart, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/650,192

(22) Filed: Aug. 29, 2000

Related U.S. Application Data

(63) Continuation of application No. 09/023,871, filed on Jul. 13, 1998, now Pat. No. 6,109,680.

(51) Int. Cl.⁷ .................................................. B60P 7/04
(52) U.S. Cl. ........................................................ 296/98
(58) Field of Search ............................................ 296/98

(56) References Cited

U.S. PATENT DOCUMENTS

| | | |
|---|---|---|
| 2,811,321 A | 10/1957 | La Barre |
| 3,549,197 A | 12/1970 | Sibley |
| 3,549,198 A | 12/1970 | Cappello |
| 3,549,199 A | 12/1970 | Sibley |
| 3,628,826 A | 12/1971 | Sibley |
| 3,868,142 A * | 2/1975 | Bachand et al. .......... 296/98 |
| 3,891,184 A | 6/1975 | Fields |
| 3,977,719 A | 8/1976 | Thurston |
| 3,990,740 A | 11/1976 | Bagwell |
| 4,133,411 A | 1/1979 | Curb |
| 4,217,987 A | 8/1980 | Gattu et al. |
| 4,258,853 A | 3/1981 | Gill et al. |
| RE30,905 E | 4/1982 | Lester et al. |
| 4,335,915 A | 6/1982 | Knapp |
| 4,659,134 A | 4/1987 | Johnson |
| 4,740,029 A | 4/1988 | Tuerk |
| 4,842,323 A | 6/1989 | Trickett |
| 4,874,196 A | 10/1989 | Goldstein et al. |
| 4,932,176 A | 6/1990 | Roberts et al. |
| 4,981,317 A | 1/1991 | Acosta |
| 4,981,411 A | 1/1991 | Ramsey |
| 5,004,032 A | 4/1991 | Pedersen |
| 5,031,955 A | 7/1991 | Searfoss |
| 5,050,924 A | 9/1991 | Hansen |
| 5,054,840 A | 10/1991 | Wilhite |
| 5,058,956 A | 10/1991 | Godwin, Sr. |
| 5,238,287 A | 8/1993 | Haddad, Jr. |
| 5,240,303 A | 8/1993 | Hageman |

(List continued on next page.)

FOREIGN PATENT DOCUMENTS

| | | | |
|---|---|---|---|
| GB | 2268718 | 1/1994 | |
| JP | 180335 | * 10/1983 | ...................... 52/3 |
| JP | 173740 | * 7/1988 | .................. 296/98 |

OTHER PUBLICATIONS

The "Hydra Cover Pioneer Cover–All" product brocure, copy in claims 296, subclass 98, received Apr. 12, 1991.*

HR 4500 Series, product brochure of the Telescoping Low–arm tm, Copyright 1995, by Pioneer Consolidated Corp.*

(List continued on next page.)

*Primary Examiner*—Dennis H. Pedder
(74) *Attorney, Agent, or Firm*—Banner & Witcoff, Ltd.

(57) ABSTRACT

A covering system for covering an open top container supported on a frame of a truck which includes a tarp device and a lifting device. The lifting device vertically moves the tarp device between a raised position at least ten feet above the frame to position tarp device high above the container and a lowered position below the top edge of the container. When the tarp device is raised, a tarp is extended from the tarp device to cover the container. The lifting device is then lowered to cover the open top of the container.

8 Claims, 4 Drawing Sheets

U.S. PATENT DOCUMENTS

| | | | |
|---|---|---|---|
| 5,275,459 | A | 1/1994 | Haddad, Jr. |
| 5,292,169 | A | 3/1994 | O'Brian |
| 5,340,187 | A | 8/1994 | Haddad, Jr. |
| 5,388,882 | A | 2/1995 | Russell et al. |
| 5,498,057 | A | 3/1996 | Reina et al. |
| 5,697,664 | A | 12/1997 | Chenowith |
| 5,743,700 | A | 4/1998 | Wood, Jr. et al. |
| 6,109,680 | A * | 8/2000 | Horner et al. ............ 296/98 |

OTHER PUBLICATIONS

Hydra–Glide Low–Arm[198], product brochure, Copyright © 1996, by Pioneer Consolidated Corp.

Installation Operation Maintenance Manual for Model HR 4500 "Hydra Cover" for Roll Offs, by Pioneer Consolidated Corp., 20 pp.

Installation Operation Maintenance Manual for Model HR 4500 RG "Rollmaster Low Arm" with Gantry Covering System for Roll Offs, by Pioneer Consolidated Corp., 12 pp.

2000SR Covering Systems, product brochure, Donovan Enterprises.

HR4500 Series, product brochure of the Telescoping Low–Arm™, Copyright © 1995, by Pioneer Consolidated Corp.

HR4500RG Covering System drawings, by Pioneer Consolidated Corp., 10/96, 7 pp.

Partial Pioneer Cover–all brochure including the Econocover covering systems.

The "Hydra Cover Pioneer Cover–All", product brochure, dated Apr. 12, 1991.

* cited by examiner

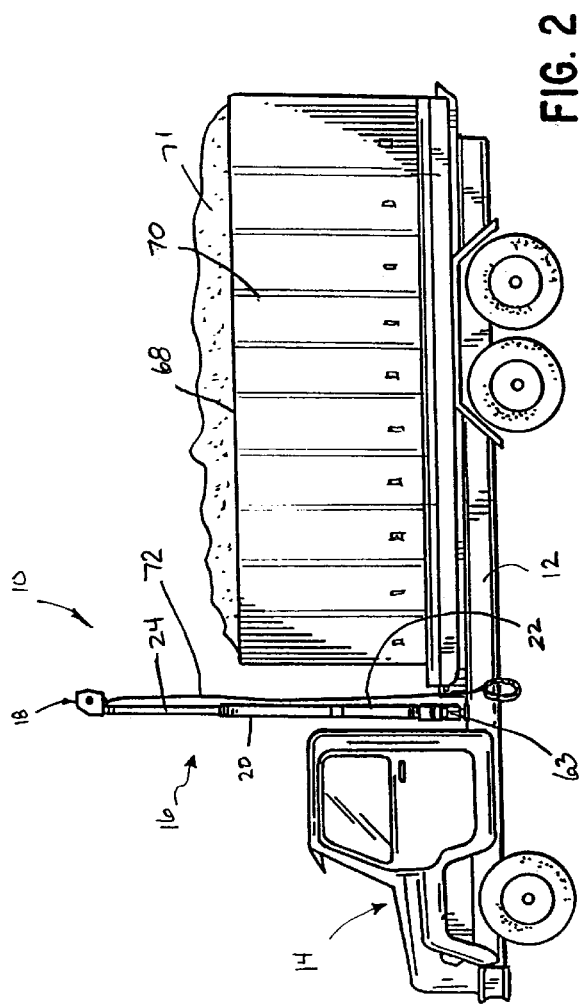
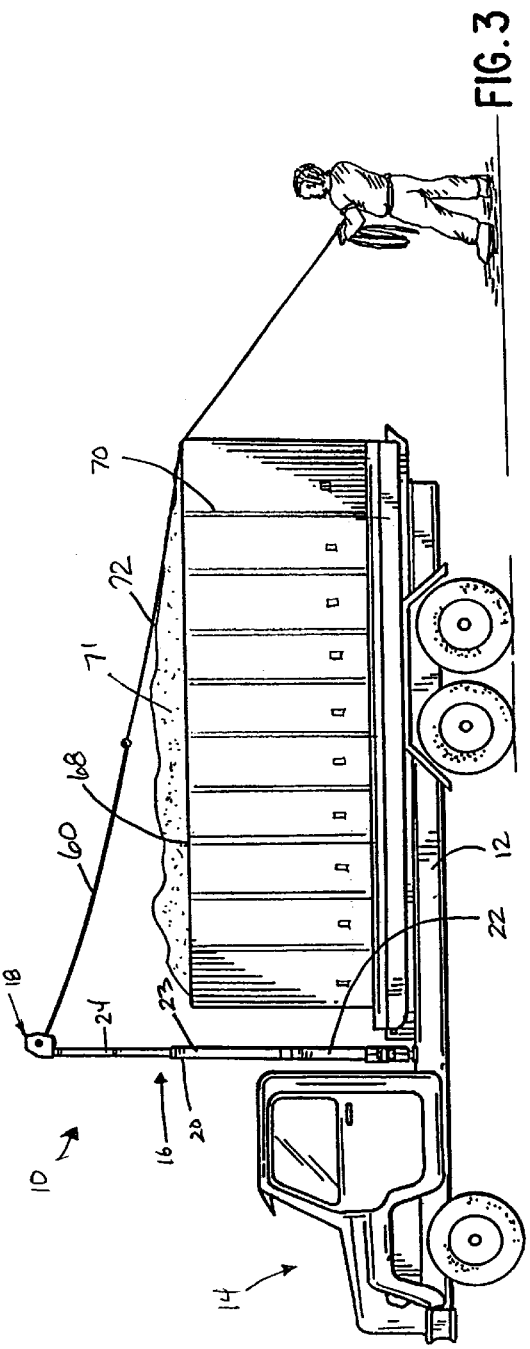

COVERING SYSTEM

This application is a continuation of application Ser. No. 09/023,871, filed Feb. 13, 1998, now U.S. Pat. No. 6,109,680, issued Aug. 29, 2000.

FIELD OF THE INVENTION

The present invention pertains to a covering system for a container mounted on a truck which facilitates easy covering and uncovering of the container.

BACKGROUND OF THE INVENTION

Trucks for hauling open top containers are frequently provided with covering systems which cover the load being transported in order to either protect the load or prevent parts of the load from being blown out of the container.

Open top containers are formed as separable units which can be secured to the frame of a truck for transport or removed for use. For example, containers used to receive and contain trash at a construction site are generally only loaded onto a truck for transport. The trash containers all have a generally rectangular shape, but vary in loading capacity, usually from 10 cubic yards to 50 cubic yards. The containers vary in both length and height, with the sidewalls ordinarily ranging from 4–8 feet in height and 10'–35' in length. Most containers in use today are 4', 6' or 8' high and 21–23 feet long.

The covering systems in the past have most commonly relied upon a tarp which extends to cover the container and retracts onto a central roller bar or other spindle to a stowage position. The truck is usually provided with arms which are pivotally attached to the frame of the truck to swing over the container in extending and retracting the tarp. However, trash containers are typically overfilled with all kinds of trash to form an irregular load which may be heaped or have items protruding upward above the upper edge of the container or outward beyond the sidewalls along any part of the container. As a result, the arms may not be able clear the load.

The arms are generally driven by hydraulic cylinders in moving the tarp to cover and uncover the load. As a result, the arms may be damaged by trying to cover a heaped or protruding load which the arms do not clear. In addition, the arms extend along the sides of the truck and are thus susceptible to being struck as the truck is moved. As a result, the use of arms can lead to higher maintenance costs. Moreover, since the arms are generally spindly, they are frequently being damaged and left in an unusable state. In systems where the arms are broken or fail to clear the load, the operators must climb onto the containers and loads in order to extend and retract the tarp. Climbing onto the container places the operator at risk of injury by either falling from the container which could be a great height off the ground or onto the load which may have sharp edges. Use of hydraulic cylinders have also led to the arms striking or trapping an operator's arm or head as the truck arms are swung about the container and causing injury. The arms, particularly if bent outward by an earlier accident, have been known to strike objects and people as the truck is driven causing damage, injury, and even death.

Further, even aside from damage and injury concerns, the use of the pivoting arms can be a burden to the operator. For example, the arms are ordinarily adjustable in length to accommodate the different sizes of containers to be hauled. A manual adjustment of the length of each arm may therefore be necessary before the load can be covered. While some systems have hydraulics or other devices to effect adjustment of the arms, these systems tend to be complex, expensive, and/or require high maintenance.

To avoid the problems associated with the use of arms, other trucks have been provided with armless covering systems which are manually extended by a pull rope. These tarp devices have normally been attached directly to the container or a fixed structure so that the tarp must be drawn along the top of the container to the rear of the truck. To facilitate this operation, most of these tarps have rollers on the outside of a pull bar to ride along the top edges or rails of the container. However, a heaped or protruding load, which is common, will tend to prevent or hinder the extension of the tarp over the container. As a result, the operator will be required to climb on the container to either lift the tarp over the heaped or protruding portions of the load or to right a pull bar which may have been directed off the top edges of the containers by the load and fallen into the container. Hence, a high risk of injury exists with these systems as well.

SUMMARY OF THE INVENTION

The present invention pertains to a covering system for open top containers hauled by trucks which alleviates many of the problems experienced in the prior art. The covering system includes a tarp device and a lifting device supported by the frame of a truck. The lifting device raises the tarp device high into the air and far above the upper edge of the range of containers to be hauled so as to provide easy extension and retraction over virtually all heaped or protruding loads. In this way, the present system eliminates the need for pivoting arms and alleviates the need to climb on the container or load. As a result, the covering operation is eased and the risk of injury is greatly reduced.

BRIEF DESCRIPTION OF THE DRAWINGS

FIG. 2 is a side elevational view of the covering system in a raised position prior to covering an open top container.

FIG. 3 is a side elevational view of the covering system with an operator extending the tarp over the container.

DETAILED DESCRIPTION OF THE PREFERRED EMBODIMENTS

Figure 1:
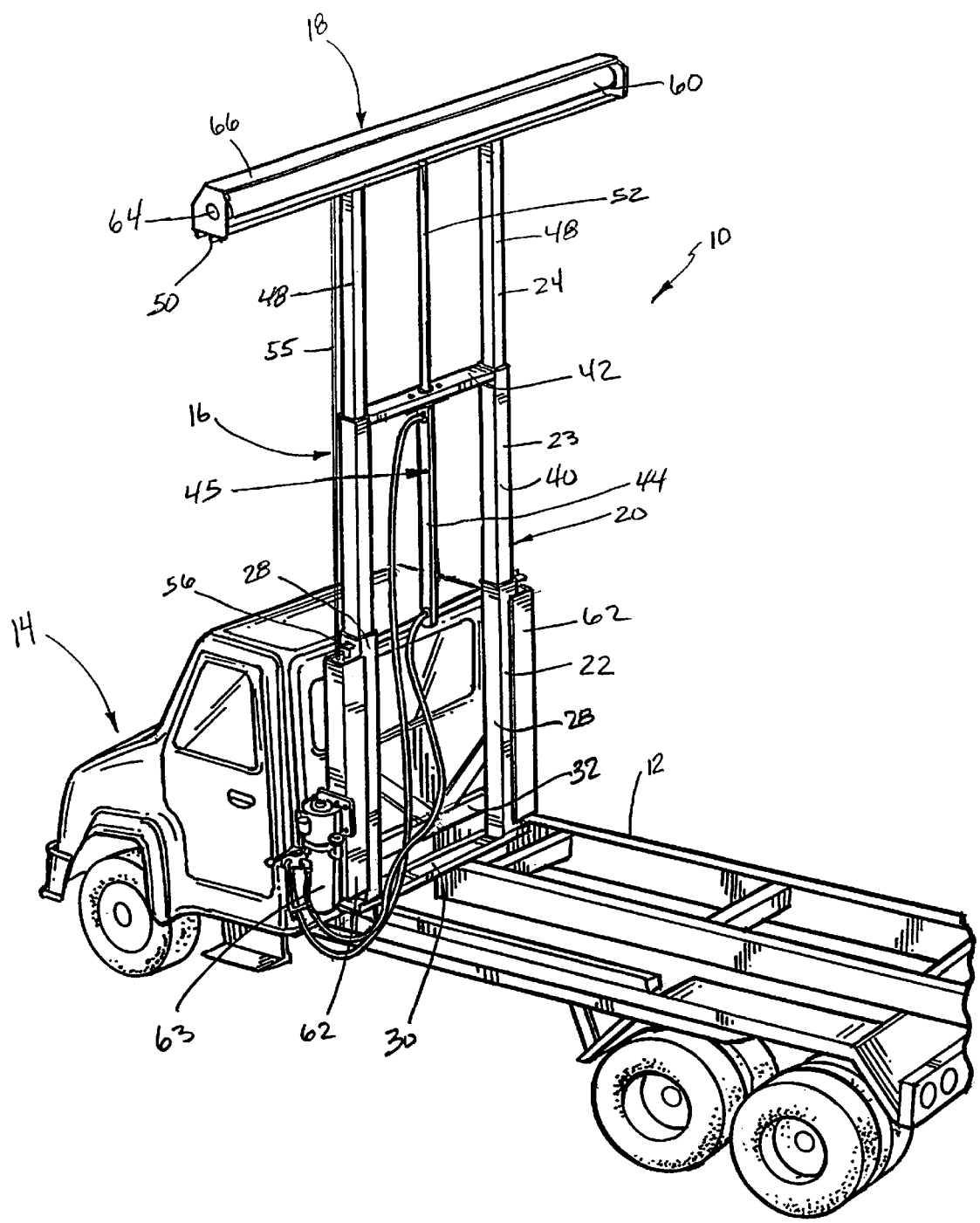
FIG. 1 is a perspective view of a covering system in accordance with the present invention mounted on a truck.
Figure 4:
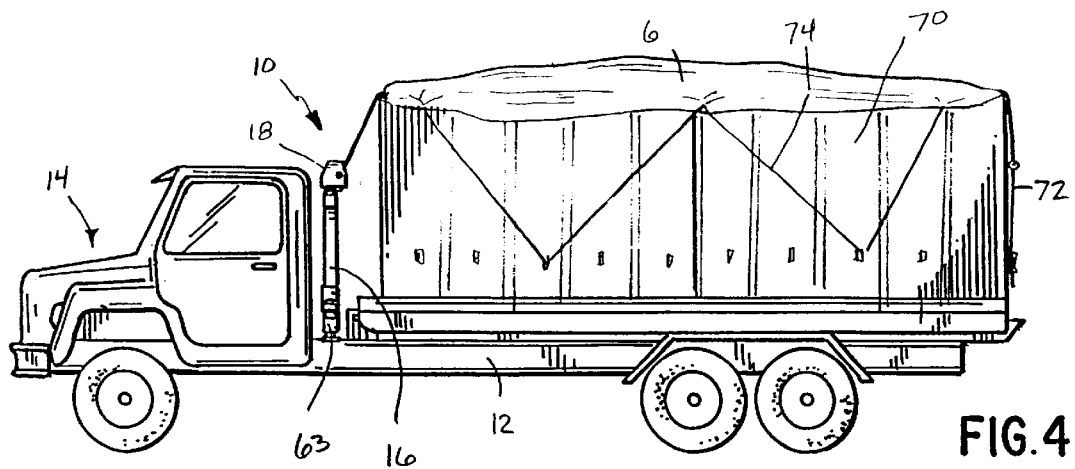
FIG. 4 is a side elevational view of the covering system in a lowered, covered position for transport.
Figure 5:
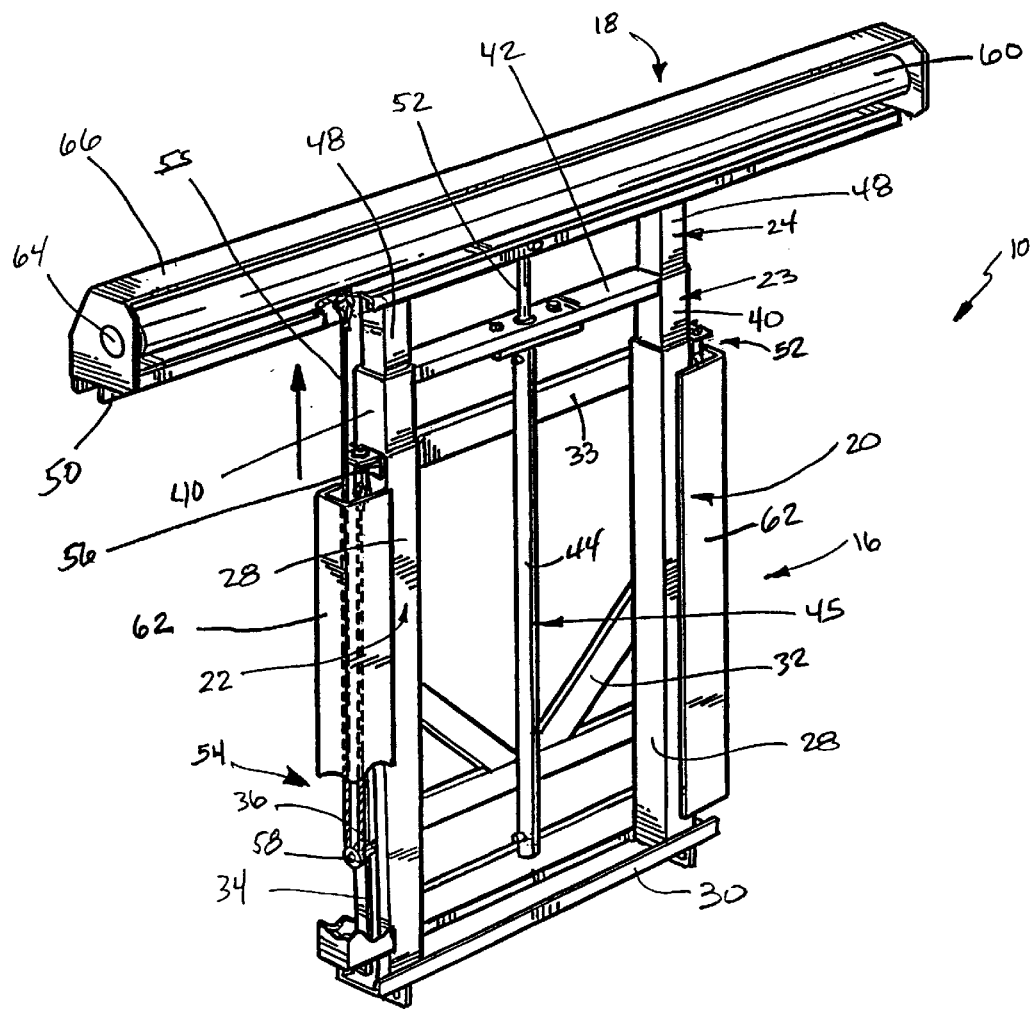
FIG. 5 is a partial, perspective view of the covering system in a first position.
Figure 6:
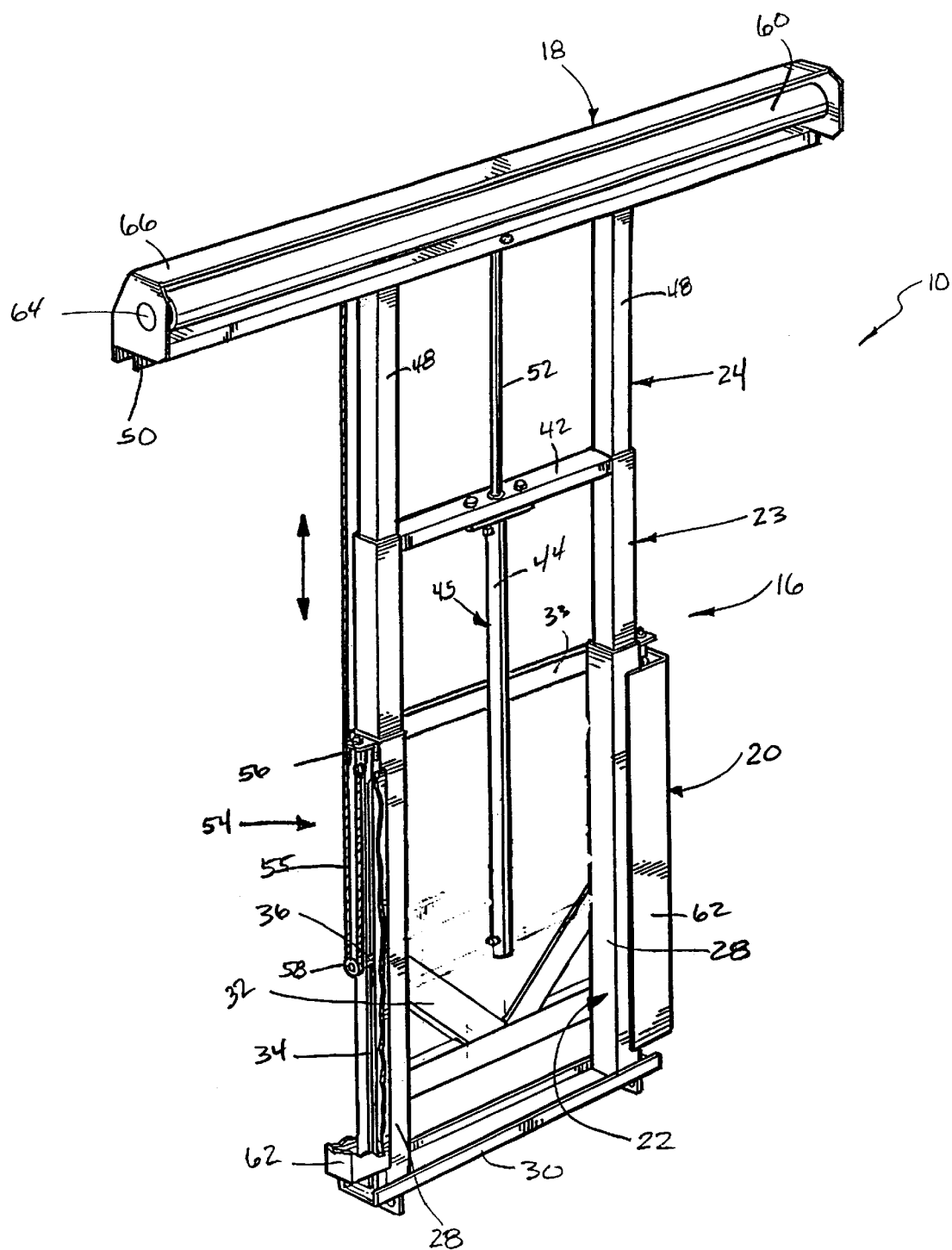
FIG. 6 is a partial, perspective view of the covering system in a second position.

In accordance with the present invention, a covering system 10 is mounted on a truck 14 adapted to support and haul open top containers. These containers will ordinarily be mounted on a lifting frame (not shown) or the like which may support the container up to about a foot above the truck frame 12 (hereinafter referred to as the frame or the frame of the vehicle). The lifting device is preferably mounted on the frame 12 but could be mounted on the lifting frame or other part of the vehicle. The covering system 10 includes a lifting device 16 and a tarp device 18.

The lifting device includes a framework 20 preferably composed of three telescoping subunits 22, 23, 24. Of course, other framework constructions involving telescoping and non-telescoping arrangements (e.g., lazy tong) could be used to lift the tarp device as discussed more fully below.

The lower subunit 22 includes a pair of hollow stanchions 28 which extend upward from a base 30. The stanchions preferably have a square cross section though other shapes could be used. The base is adapted to be fixedly secured, e.g., by bolting or other means, to frame 12 of truck 14. A lower support assembly 32 and an upper cross support 33 extend between stanchions 28 to stabilize lifting device 16. The outer faces of stanchions 28 are formed with elongated, vertical slots 34 to receive pulley supports 36.

Medial subunit 23 has a generally rectangular configuration composed of a pair of hollow, vertical posts 40 which are matingly received into the open upper ends of stanchions 28. The posts 40 are interconnected by a cross rail 42 for support and stability of the subunit. The cylinder 44 of a hydraulic unit 45 is also secured to cross rail 42. While the use of a hydraulic piston and cylinder unit is preferred, other lifting elements could be used.

Upper subunit 24 has a similar construction with a pair of vertical legs 48 matingly received within the open upper ends of posts 40, and an upper mount 50 interconnecting the two legs. Mount 50 is a horizontal member to which the tarp device 18 is bolted or otherwise secured. The piston rod 52 of hydraulic unit 45 extends out of cylinder 44 and attaches to mount 50 to raise and lower subunit 24.

Lifting device 16 also preferably includes at least one pulley system 54 (e.g., centrally mounted on framework 20), although one on each aide of framework 20 is preferred, to cooperate with hydraulic unit 45 in raising and lowering mount 50. Nevertheless, pulley systems are not required. The subunits of the framework could be expanded and contracted by other means such as a pair of hydraulic cylinder units, one large hydraulic unit or other non-hydraulic means such as screw drives. Further, a wide variety of actuators to cause lifting of the tarp device could be used with other framework constructions.

Since both pulley systems in the preferred construction are identical, only one will be described in detail. One end of a chain 55 or the like is attached to mount 50, whereas the other end is attached via bracket 56 to the upper end of a stanchion 28. An intermediate portion of the chain is wrapped about pulley 58 which is secured to the lower end of medial subunit 23 via pulley support 36. As piston rod 52 extends, mount 50 is raised relative to base 30. The upper end of chain 55 is raised with mount 50 which, in turn, lifts pulley 54. Since the pulley is secured to a post 40, subunit 23 is also raised with the extension of piston rod 52. The pulley system enables the tarp device to be raised a greater distance than the extension of the piston rod or other actuator. In this way, the tarp device can be raised to a greater height with a smaller hydraulic unit. In the preferred construction, the tarp device is lifted at a 2:1 ratio to the extension of the hydraulic unit 45, though other ratios could be used. In other words, the tarp device will be raised two feet for every one foot the piston rod 52 is extended. The use of a single, central lifting member also enables easier leveling of the tarp device, which helps ensure a smooth extension and retraction of the tarp.

A pair of covers 62 are preferably attached along the stanchions 28 to cover the bulk of the pulley systems 54. The covers are channel members which are welded to the front and rear faces of stanchions 28. In the preferred embodiment, a fluid pump 63 of conventional design is mounted on one of the covers 62 or a elsewhere on the truck to actuate hydraulic unit 45. Alternatively, hydraulic unit 45 can be run from the truck's hydraulic system (not shown).

The tarp device 18 is of a conventional design and includes a tarp 60 which is wound onto a central roller bar 64. The roller bar 64 is rotatably mounted in a housing 66, although the use of a housing is not essential. The roller bar is spring biased to automatically retract the tarp into the housing. In the preferred construction, the spring (not shown) applies a variable pulling force which increases with the extension of tarp 60. As an example, the spring of the roller bar may apply only about 13 pounds of force when the tarp is being initially pulled from the housing, but up to about 50 pounds of force when the tarp is fully extended. Alternatively, the tarp device may be retracted by a hydraulic motor, crank, or other means.

In use, lifting device 16 is fully extended to raise tarp device 18 to its maximum height. The tarp is then pulled out over the container on the truck by an operator at the rear of the truck. By raising the tarp device high into the air and far above the container, the tarp is able to clear nearly all heaped or protruding loads of any of the containers in common use, i.e., containers with 4, 6 or 8 foot high sidewalls. Further, by raising the tarp device high above the container, the tarp can also be easily pulled over loads which project laterally beyond the sidewalls of the container, a problem that commonly damages or restricts the movements of prior arm systems. As compared to prior covering systems, the present invention eases the covering operation by overcoming the problem associated with heaped and protruding loads. Moreover, by enabling pulling of the tarp over heaped and protruding loads, the system virtually eliminates climbing on the container.

The high position of the tarp device 18 during extension of tarp 60 also enables the pull line 72 to approach a linear relationship (i.e., with a broad obtuse angle) with tarp 60 and thereby ease the pulling force required to extend the tarp. This angle may be further broadened as desired by the operator walking farther from the truck, at least within the range of the pull rope. In past systems where the tarp device is at the upper edge of the container, the pull line has been forced to assume a much sharper angle over the rear of the container and thereby require a greater pulling force.

In the most preferred embodiment, tarp device 18 is raised up to about 12 feet above frame 12. For the 4, 6 and 8 foot high containers in use today, this height would raise the tarp device at least about 3–4 feet above top edge 68 of the largest containers, and up to 5–8 feet above the other containers. This arrangement enables the tarp to be extended over nearly all loads encountered in the industry. Nevertheless, heights as low as about 10 feet above frame 12 should be sufficient to clear most of the loads encountered by an operator and to a large extent provide the above-noted benefits, particularly since most containers in use have 6 foot high walls. It is common for an operator to be unaware of the size of the container to be transported before arriving to pick it up. Operators are usually required over time to transport containers having 4, 6 and 8 foot high walls. Hence, the lifting device must be able to raise the tarp device at least ten feet above the frame of the vehicle, and preferably twelve feet, to accommodate the height variation in containers and realize the benefits of the present invention.

When the tarp device has been lifted to its raised position high above the container, the operator proceeds to the rear of the truck with pull line 72 and pulls out tarp 60 to cover the open top of container 70. Once the tarp covers the container and overhangs the rear of the container, the operator secures the pull line about a bar or other means at the rear of the containers or truck. Tarp device 18 is then lowered by lifting device 16 is to lower the tarp on top of the container. Preferably, the tar device is fully lowered to its lowest position, but could be placed at a less then fully retracted position so long as the tarp device is brought to or below the upper edge of the container so as to cover the load and prevent air from blowing up under the tarp. To ensure proper positioning for the containers in common use today the lowered position of the tarp device should be within about four feet of the top of the lifting frame. As the tarp device is lowered, the tension applied by the spring of the roller bar takes up any excess slack in the tarp to provide a relatively tight tarp which amply closes the open top. The sides of the cover may be secured by an elastic cord 74 which is pulled down and secured to hooks or other means on the sides of the container, but is not required.

To uncover container 70, cord 74 (if used) is first released and tarp device 18 raised by lifting device 16. Pull rope 72 is then released from the container and loosely supported so as to permit tarp 60 to feed back onto roller bar 64 by virtue of the spring (not shown). Once the tarp is fully retracted, tarp device 18 is lowered. The pull rope is then secured to the truck near the front of the container.

The above discussion concerns the preferred embodiments of the present invention. Various other embodiments as well as many changes and alterations may be made without departing from the spirit and broader aspects of the invention as defined in the claims.

What is claimed is:

1. A covering system for covering an open top container mounted on a vehicle comprising:

a tarp device having a tarp movable between a covering position wherein said tarp is extended to cover an open top of a container mounted on a vehicle and a stowage position wherein said tarp is retracted; and a lifting device comprising a framework which includes at least a first subunit, a second subunit and a third subunit which are movable relative to each other, a lifting element connected to at least one of said subunits for vertically raising the at least one subunit relative to the vehicle and at least one pulley system which includes at least one flaccid line with one end of said line attached to said first subunit, another end of said line attached to said second subunit, and an intermediate portion of said line that extends about a pulley attached to said third submit, said lifting device mounted on a vehicle and supporting said tarp device for movement adjacent one end of the container between a raised position at least about twelve feet above a frame of the vehicle to position the tarp device at least about three feet above the open top of the container and a lowered position to position the tarp device substantially below the raised position whereby the tarp device is brought to or below the open top of the container.

2. A covering system in accordance with claim 1 in which said lowered position is within about four to five feet of the frame.

3. A covering system in accordance with claim 1 in which said framework is a telescoping framework.

4. A covering system in accordance with claim 3 in which said lifting element is an extensible hydraulic unit.

5. A covering system in accordance with claim 4 wherein said at least one pulley system increases the elevation of said tarp device by an amount greater than the extension of said hydraulic unit.

6. A covering system in accordance with claim 1 in which said lifting device moves in only a vertical direction.

7. A covering system in accordance with claim 1 which further includes a flexible member attached to said tarp for moving the tarp tot he extended position without the use of mechanical arms.

8. A covering system in accordance with claim 7 wherein said flexible member comprises a rope.

* * * * *